United States Patent
McGinnis

(10) Patent No.: US 12,338,158 B2
(45) Date of Patent: Jun. 24, 2025

(54) APPARATUSES, SYSTEMS AND METHODS FOR COLD FORMING GLASS

(71) Applicant: CORNING INCORPORATED, Corning, NY (US)

(72) Inventor: James Edward McGinnis, Watkins Glen, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/599,766

(22) Filed: Mar. 8, 2024

(65) Prior Publication Data
US 2024/0208851 A1 Jun. 27, 2024

Related U.S. Application Data

(63) Continuation of application No. 17/198,722, filed on Mar. 11, 2021, now Pat. No. 11,952,304.
(Continued)

(51) Int. Cl.
*C03B 23/023* (2006.01)
*B32B 37/00* (2006.01)
(Continued)

(52) U.S. Cl.
CPC ........ *C03B 23/023* (2013.01); *B32B 37/0046* (2013.01); *B32B 37/10* (2013.01);
(Continued)

(58) Field of Classification Search
CPC ... C03B 23/023; C03B 23/0357; C03B 23/02; B32B 37/0046; B32B 37/10;
(Continued)

(56) References Cited

U.S. PATENT DOCUMENTS 4,899,507 A 2/1990 Mairlot
8,305,743 B2 11/2012 Wu et al.
(Continued)

FOREIGN PATENT DOCUMENTS

EP 3482253 A1 5/2019
JP 2013-188993 A 9/2013
(Continued)

OTHER PUBLICATIONS

Belis et al., "Cold bending of laminated glass panels", Heron, vol. 52, 2007, pp. 123-146.
(Continued)

*Primary Examiner* — Cynthia L Schaller
(74) *Attorney, Agent, or Firm* — Daniel J. Greenhalgh

(57) ABSTRACT

The disclosure relates to forming methods, systems, apparatuses and resulting displays that represent improvements in various key areas. The disclosed methods, systems and apparatuses can include a backing configured to support the glass substrate. In one embodiment, the backing can comprise a plurality of linkages. The one or more of the plurality of linkages are selectively moveable to interface with and correspond to a radius of curvature of the curved portion of the glass substrate However, other embodiments contemplate segments, mesh or other construction for the backing.

20 Claims, 11 Drawing Sheets

Related U.S. Application Data

(60) Provisional application No. 62/988,481, filed on Mar. 12, 2020.

(51) Int. Cl.
*B32B 37/10* (2006.01)
*B32B 37/12* (2006.01)
*B32B 38/18* (2006.01)

(52) U.S. Cl.
CPC .......... *B32B 38/1866* (2013.01); *B32B 37/12* (2013.01); *B32B 2315/08* (2013.01); *Y10T 156/1043* (2015.01)

(58) Field of Classification Search
CPC . B32B 38/1866; B32B 37/12; B32B 2315/08; Y10T 156/1043; G09F 9/00; B60K 35/00; B61L 15/009; B63B 49/00; B64D 43/00
See application file for complete search history.

(56) References Cited

U.S. PATENT DOCUMENTS

| | | |
|---|---|---|
| 2005/0184970 A1 | 8/2005 | Wegert et al. |
| 2009/0284904 A1 | 11/2009 | Wu et al. |
| 2013/0265262 A1 | 10/2013 | Jung et al. |
| 2017/0238412 A1 | 8/2017 | Huitema et al. |
| 2018/0050948 A1 | 2/2018 | Faik et al. |
| 2018/0065881 A1* | 3/2018 | Hashimoto ............. B32B 17/06 |
| 2019/0077262 A1 | 3/2019 | Benjamin et al. |
| 2020/0026955 A1 | 1/2020 | Narasimha et al. |
| 2021/0089076 A1* | 3/2021 | Stegemann ........... G06F 1/1601 |

FOREIGN PATENT DOCUMENTS

| | | |
|---|---|---|
| WO | 2017/004328 A1 | 1/2017 |
| WO | 2018/009504 A1 | 1/2018 |
| WO | 2018/129065 A2 | 7/2018 |
| WO | 2019/010401 A1 | 1/2019 |
| WO | 2019/055469 A1 | 3/2019 |

OTHER PUBLICATIONS

European Patent Application No. 21162046.3, Extended European Search Report dated Jul. 5, 2021; 8 pages; European Patent Office.

Galuppi et al., "Localized contacts, stress concentrations and transient states in bent-lamination with viscoelastic adhesion. An analytical study", International Journal of Mechanical Sciences, vol. 103, 2015, 30 pages.

Galuppi et al., "Optimal cold bending of laminated glass", International Journal of Solids and Structures, vol. 67-68, 2015, pp. 231-243.

Ha et al., "Adhesion strength characterization for different frame materials of handheld products", Journal of Mechanical Science and Technology, vol. 31, 2017, pp. 4795-4804.

* cited by examiner

APPARATUSES, SYSTEMS AND METHODS FOR COLD FORMING GLASS

CROSS-REFERENCE TO RELATED APPLICATIONS

This application is a continuation of U.S. application Ser. No. 17/198,722, filed on Mar. 11, 2021, which claims the benefit of priority of U.S. Provisional Application Ser. No. 62/988,481, filed on Mar. 12, 2020, the content of each of which is relied upon and incorporated herein by reference in its entirety.

BACKGROUND

Vehicle interiors can include curved surfaces that incorporate displays and/or touch panels. The materials used to form such curved surfaces are typically limited to polymers, which do not exhibit the durability, appearance, feel and optical performance of glass. As such, curved glass substrates are desirable, especially when used as covers for displays and/or touch panels. Existing methods of forming curved glass substrates, such as thermal forming, have drawbacks including high cost, and optical distortion and/or surface marking occurring during curving or shaping. Accordingly, there is a need for vehicle interior systems that can incorporate a curved glass substrate in a cost-effective manner and without the problems typically associated with glass thermal forming processes. However, current cold forming methods have various drawbacks including that an adhesive layer is subject to both shear and tensile stress in some instances.

SUMMARY

The disclosure provides, among other things, cold formed 3D products such as curved glass substrates for surfaces in a vehicle interior such as vehicle displays. In addition, the methods, systems and apparatuses of forming such curved glass substrates provided herein provide for various improvements. These improvements can include elimination of a need to pre-fabricate a specific form that is adhered to the glass and becomes part of the final product, elimination of the need to dispense adhesive with a uniform thickness onto the form, structural loading being concentrated as a shear force such that tensile force, and hence, tensile stress is reduced on the bonding medium used to adhere with the curved glass substrate, improved replaceability of the curved glass substrate and/or improved usability by facilitating dynamic movement such as bending of the display to provide for flexibility of visualization for the display while in use.

DESCRIPTION OF THE DRAWINGS

The drawings illustrate generally, by way of example, but not by way of limitation, various embodiments discussed herein.

Figure 1:
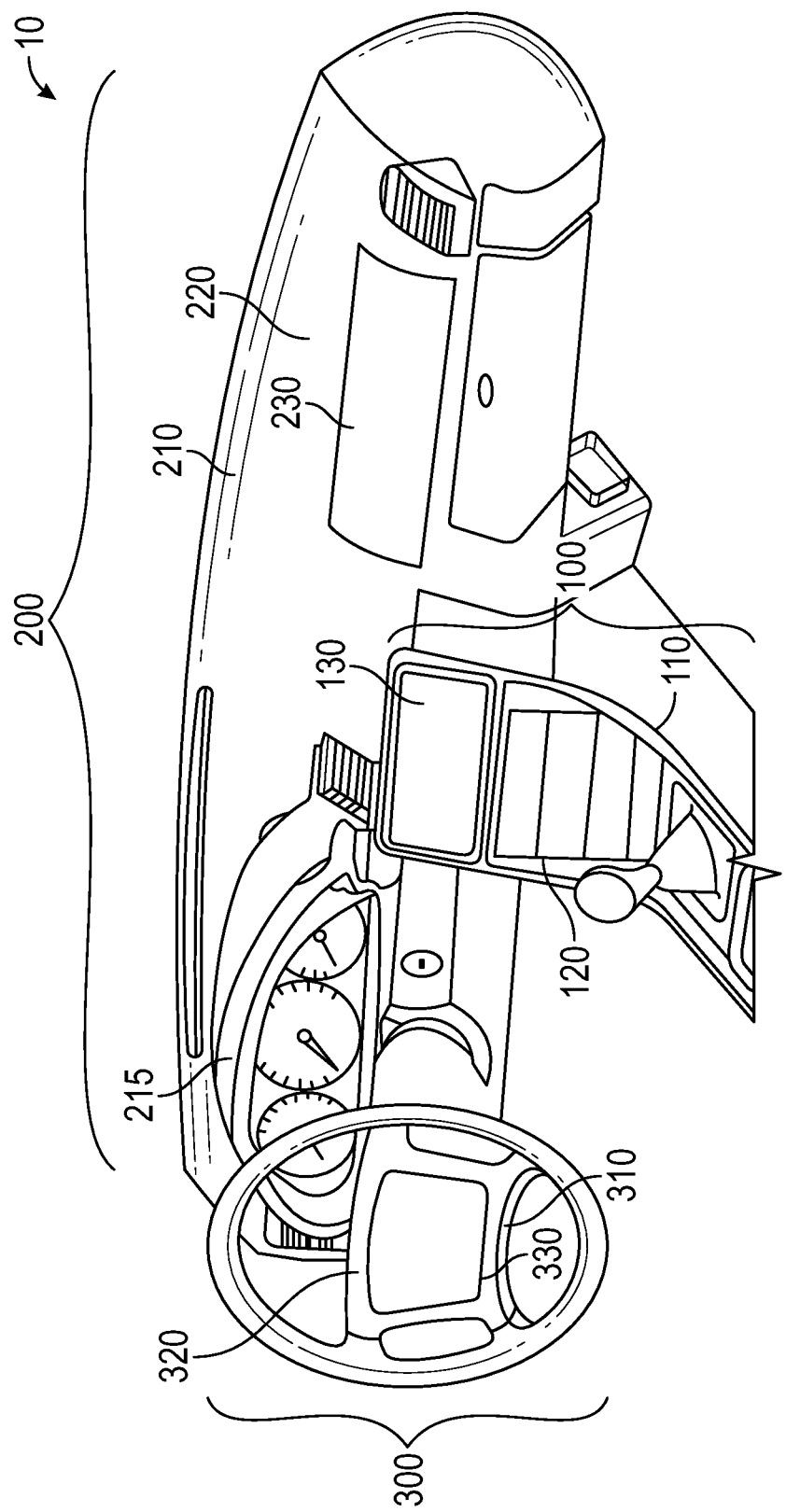
FIG. 1 is a perspective view illustration of a vehicle interior with vehicle interior systems according to one embodiment.

Repeated use of reference characters in the specification and drawings is intended to represent the same or analogous features or elements of the disclosure, even when the numbers by 100 from figure-to-figure. It should be understood that numerous other modifications and examples can be devised by those skilled in the art, which fall within the scope and spirit of the principles of the disclosure.

DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Vehicle interior systems may include a variety of different curved surfaces that are designed to be transparent, such as curved display surfaces, and the present disclosure provides articles and methods for forming these curved surfaces which include a glass substrate. Displays for vehicle interior systems have typically been equipped with a frame that allows components of the display to be more easily viewed when the display is on. The frame can also contrast the color or pattern of the display to adjacent automotive interior components. Furthermore, the frame can provide support for the components of the display.

Cold forming (e.g., bending) is an energy efficient method of creating curved glass substrates having a radius of curvature based on the elastic deformation of glass at relatively low temperature (e.g., <140° C.) with the application of out of plane loads to create the desired shape. During the cold forming process, a flat high-strength glass substrate is three-dimensionally (3D) deformed. Typically, the glass substrate is mechanically fixed by an adhesive interlayer to the target pre-formed 3D frame to which, e.g., display functional modules are mounted. However, this process has proven difficult as the adhesive interlayer can peel away or otherwise become decoupled from one of the glass substrate or the frame.

This disclosure provides methods of cold forming, systems, apparatuses and resulting displays that represent improvements in various key areas. According to one embodiment, a new method of cold forming is disclosed. With this method, a radius of curvature for the glass substrate can be defined by a form that may not become a part of the display. This form can have moveable segments/linkages, can be reusable and/or programmable, for example. This form is referred to as a forming apparatus herein. A bonding medium can be applied to the glass substrate and adhered. The forming apparatus can comprise, for example, a plurality of linkages such as those of a flexible mesh, chain mail or other construction as discussed herein. The forming apparatus can be adhered to the glass substrate and bonding medium by the remaining exposed side of the bonding medium. The bonding medium can hold one or more of the linkages of the plurality of linkages at a desired angle for cold forming by engaging with surface(s) of the linkages pressing into the bonding medium. Alternative methods of positionally fixing (sometimes termed locking herein) the linkages together with a desired angle are discussed herein. The assembly (including the glass substrate, bonding medium and the forming apparatus can be held in a vacuum mold or otherwise compressed (e.g. pressure formed with a mold, etc.) until the bonding medium is strong enough to hold the cold formed curvature desired. This cold formed curvature can be imparted from the forming apparatus to the glass substrate via the bonding medium. The forming apparatus and/or the bonding medium can then optionally be removed from the display.

The disclosed method, for example, eliminates the need for a frame as part of the display. However, if utilized, the frame need not be structural in construction. According to some embodiments, the forming apparatus can be retained as a backing or can form a frame for the display. This backing can be cut or otherwise shaped to any desired dimensions and matched to the glass substrate. This variable dimensioning can be valuable in high part mix manufacturing operation such as automotive interior manufacturing. Additionally, the disclosed method can eliminate the need to dispense a liquid epoxy (or other adhesive) with a uniform thickness onto the frame as has been the case with prior methods that utilize a structural frame. Missing adhesive or even thickness variation of such adhesive can have the potential to cause stress concentrations that can weaken the display. These potential problems can be avoided utilizing the forming apparatus. According to one embodiment, the forming apparatus can facilitate the use of a structural tape as the bonding medium. This structural tape can be cut precisely to shape. This cutting can be done before the forming apparatus is removed. Furthermore, the forming apparatus can utilize linkages or other moveable members such as segments with articulating joint such as a hinge or other type of connection. These hinges or other articulating connections can cause the resultant structural load on the adhesive being more concentrated in the shear force than static tensile force as force is transferred from glass substrate back to the hinge in the forming apparatus. Reducing static tensile force (and resulting stress) can improve adhesion between the glass substrate and the bonding medium.

Further embodiments disclosed herein are directed to the construction of the backing and uses thereof. The backing can have the same or similar construction as that of the forming apparatus. Indeed, in some embodiments the forming apparatus can subsequently be utilized as the backing for the glass substrate, frame and/or other components of the display. However, this may not be the case in other embodiments. Thus, for example, the forming apparatus can be removed from the display after cold forming and a separate backing can be installed. The construction of the backing is further discussed herein.

The backing can enhance the replaceability of the display. For example, if the glass substrate should become scratched or broken, a new backing and glass substrate can be utilized to replicate the original. This can be accomplished by flexing the backing and removing the bonding medium (such as structural tape) from the glass substrate. This can be done without damaging the display module and touch panel unit. Additionally, according to some embodiments, the backing can enable a display that is flexible with a dynamic bending capability. More particularly, the backing can be constructed of moveable linkages, sections, segments, hinges, articulating connections, etc. that are capable of selective movement relative to one another and relative to the glass substrate. This moveable construct for the backing can make the backing flexible. An actuator (e.g., motor(s), linkage(s), wire/pulley(s), reel, pinion/rack(s), hydraulic device(s), combinations thereof, etc.) can drive one or more of the linkages (or another member if alternatively used) of the backing to various positions as desired. The actuator can have a construction of actuators used to reposition an automobile's side mirrors, for example. Hinges or articulating connection of the backing can be free to move and may not be bonded or otherwise locked in position. Thus, the actuator(s) can be attached or otherwise coupled to the backing and can be configured to control and shape the glass substrate of the display via the backing for improved user viewing angle(s) of the display.

As used herein, the terms "cold forming" "cold formed," "cold bent," or "cold bending" and iterations thereof refers to curving the glass substrate at a temperature which is less than the softening point of the glass. The term "cold bendable" "bendable" or "flexible" refers to the capability of a glass substrate to be cold bent or otherwise geometrically changed such as in the dynamic manner using the actuator(s) and backing described in FIGS. 8-9D.

FIG. 1 shows a vehicle interior 10 that includes three different vehicle interior systems 100, 200, 300, according to an exemplary embodiment. Vehicle interior system 100 includes a center console base 110 with a curved surface 120 including a display, shown as curved display 130. Vehicle interior system 200 includes a dashboard base 210 with a curved surface 220 including a display, shown curved display 230. The dashboard base 210 typically includes an instrument panel 215 which may also include a curved display. Vehicle interior system 300 includes a dashboard steering wheel base 310 with a curved surface 320 and a display, shown as a curved display 330. In one or more embodiments, the vehicle interior system may include a base that is an arm rest, a pillar, a seat back, a floor board, a headrest, a door panel, or any portion of the interior of a vehicle that includes a curved surface.

The articles and techniques described herein can be used in any or all of vehicle interior systems 100, 200 and 300. Thus, they are not limited to displays. While FIG. 1 shows an automobile interior, the various embodiments of the vehicle interior system may be incorporated into any type of vehicle such as trains, automobiles (e.g., cars, trucks, buses and the like), sea craft (boats, ships, submarines, and the like), and aircraft (e.g., drones, airplanes, jets, helicopters and the like), including both human-piloted vehicles, semi-autonomous vehicles and fully autonomous vehicles.

Figure 2:
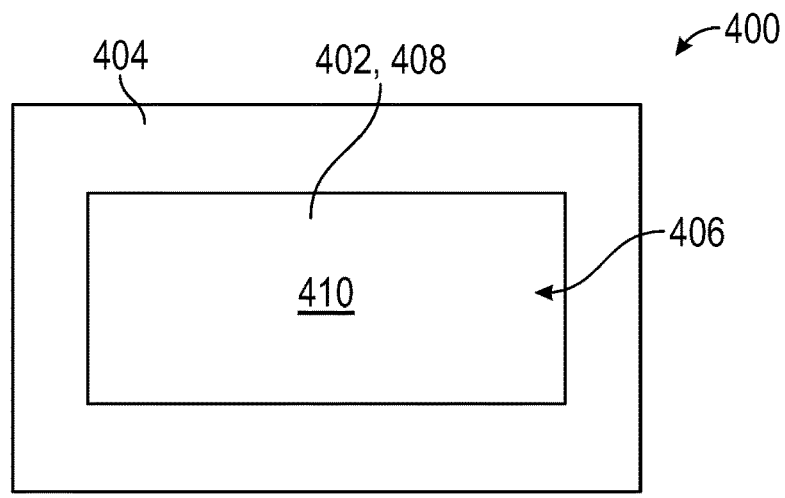
FIG. 2 is a front view of a display including a curved glass substrate and frame according to one embodiment.

FIG. 2 shows a display 400 for a vehicle interior system according to one embodiment. Methods, systems and apparatuses for forming the display 400 are further discussed in reference to FIGS. 3A-9D. It should be recognized that the techniques and apparatus of FIGS. 3A-9D are not limited to the display 400 but to any display or other vehicle component including those of FIG. 1. As shown in both FIG. 2, the display 400 includes a glass substrate 402, and a frame 404. The frame 404 is entirely optional and may not be utilized according to some embodiments. According to some embodiments, the frame 404 can be formed by the backing and/or bonding medium as further described herein. The frame 404 may not be utilized for support (e.g., to facilitate or maintain the curvature of the glass substrate 402), and thus, can be non-structural. A structural frame has typically been utilized previously. The frame 404 can be utilized for aesthetic purposes and for contrast with a display module (not shown). According to some embodiments, the backing can provide support (e.g., to facilitate or maintain the curvature of the glass substrate 402) or a combination of the frame 404 and backing can be utilized for support.

As shown in FIG. 2, the frame 404 include a first opening 406 configured to house further display components or modules (not shown). The frame 404 and glass substrate 402 can includes a curved portion 408.

A radius of curvature of the curved portion 408 can be, for example, about 20 mm or greater, 40 mm or greater, 50 mm or greater, 60 mm or greater, 100 mm or greater, 250 mm or greater or 500 mm or greater. For example, the radius of curvature may be in a range from about 20 mm to about 2000 mm, from about 30 mm to about 2000 mm, from about 40 mm to about 1500 mm, from about 50 mm to about 1500 mm, 60 mm to about 1500 mm, from about 70 mm to about 2000 mm, from about 80 mm to about 1500 mm, from about 90 mm to about 2000 mm, from about 100 mm to about 2000 mm, from about 120 mm to about 2000 mm, from about 140 mm to about 2000 mm, from about 150 mm to about 2000 mm, from about 160 mm to about 2000 mm, from about 180 mm to about 2000 mm, from about 200 mm to about 2000 mm, from about 220 mm to about 2000 mm, from about 240 mm to about 2000 mm, from about 250 mm to about 2000 mm, from about 260 mm to about 2000 mm, from about 270 mm to about 2000 mm, from about 280 mm to about 2000 mm, from about 290 mm to about 2000 mm, from about 300 mm to about 2000 mm, from about 350 mm to about 2000 mm, from about 400 mm to about 2000 mm, from about 450 mm to about 2000 mm, from about 500 mm to about 2000 mm, from about 550 mm to about 2000 mm, from about 600 mm to about 2000 mm, from about 650 mm to about 2000 mm, from about 700 mm to about 2000 mm, from about 750 mm to about 2000 mm, from about 800 mm to about 2000 mm, from about 900 mm to about 2000 mm, from about 950 mm to about 2000 mm, from about 1000 mm to about 2000 mm, from about 1250 mm to about 2000 mm, from about 20 mm to about 1400 mm, from about 20 mm to about 1300 mm, from about 20 mm to about 1200 mm, from about 20 mm to about 1100 mm, from about 20 mm to about 1000 mm, from about 20 mm to about 950 mm, from about 20 mm to about 900 mm, from about 20 mm to about 850 mm, from about 20 mm to about 800 mm, from about 20 mm to about 750 mm, from about 20 mm to about 700 mm, from about 20 mm to about 650 mm, from about 20 mm to about 200 mm, from about 20 mm to about 550 mm, from about 20 mm to about 500 mm, from about 20 mm to about 450 mm, from about 20 mm to about 400 mm, from about 20 mm to about 350 mm, from about 20 mm to about 300 mm, from about 20 mm to about 250 mm, from about 20 mm to about 200 mm, from about 20 mm to about 150 mm, from about 20 mm to about 100 mm, from about 20 mm to about 50 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm.

The glass substrate 402 can be comprised of suitable glass compositions for use in the cold formed glass substrates described herein include soda lime glass, aluminosilicate glass, borosilicate glass, boroaluminosilicate glass, alkali-containing aluminosilicate glass, alkali-containing borosilicate glass, and alkali-containing boroaluminosilicate glass.

The glass substrate 402 can be strengthened using any suitable method known in the art, including by including compressive stress (CS) into the glass substrate, that extends from a surface to a depth of compression (DOC); by utilizing a mismatch of the coefficient of thermal expansion between portions of the article to create a compressive stress region and a central region exhibiting a tensile stress; thermally by heating the glass to a temperature above the glass transition point and then rapidly quenching; and chemically by ion exchange, where, e.g., ions at or near the surface of the glass substrate are replaced by, or exchanged with, larger ions having the same valence or oxidation state.

As used herein, the term "glass substrate" is used in its broadest sense to include any object made wholly or partly of glass. Glass substrates include laminates of glass and non-glass materials, laminates of glass and crystalline materials, and glass-ceramics (including an amorphous phase and a crystalline phase). The glass substrate may be transparent or opaque. Cold-formed glass substrate can include a colorant that provides a specific color.

The thickness of the glass substrate 402 can be tailored to allow the glass substrate 402 to be flexible to achieve a desired radius of curvature. Moreover, a thinner glass substrate 402 may deform more readily, which could potentially compensate for shape mismatches and gaps that may be created by the shape of the display 400 (when curved). The glass substrate 402 and at least a portion of the frame 404 can have substantially similar radii of curvature to provide a substantially uniform distance therebetween.

The glass substrate 402 can be positioned on the frame 404 and can include the central portion interfacing with and generally conforming to a corresponding curved portion of the frame 404. As illustrated, the glass substrate 402 includes a first major surface 410 immediately facing the viewer and a second opposing second major surface (not numbered) interfacing with the frame 404 and/or other components.

The frame 404 has an interior surface that defines the opening 406. The interior surface can provide for mechanical alignment for positioning the display module within the opening 406.

Figure 3A:
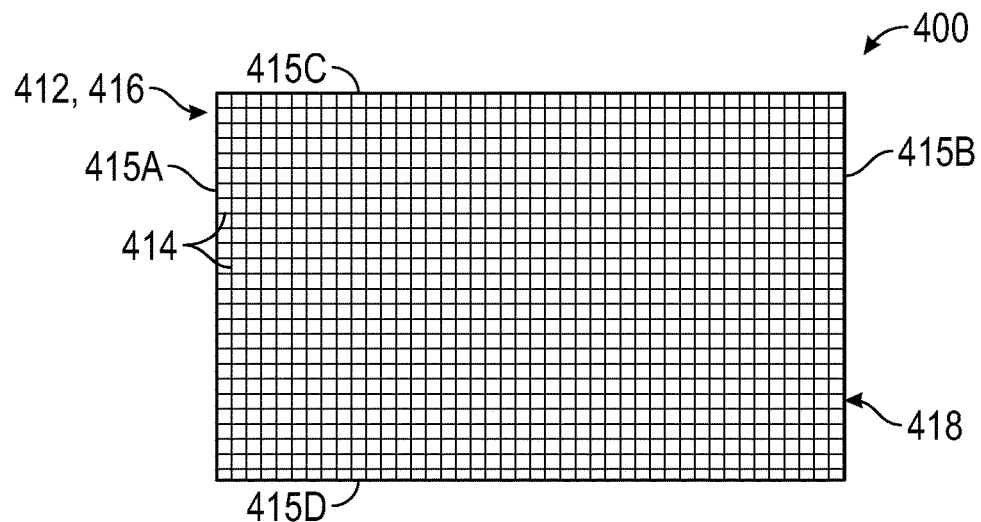
FIG. 3A is a back view of the display of FIG. 2 having a backing with a first configuration according to a first embodiment.

FIG. 3A shows an opposing side of the display 400 from that of FIG. 2 and further illustrates a backing 412 according to one embodiment. The backing 412 can comprise a plurality of linkages 414. These linkages 414 are illustrated at a schematic manner in FIGS. 3A-3E. The linkages 414 can be selectively moveable such as relative to one another (and the glass substrate, bonding medium, etc.) as further described herein subsequently. Various embodiments of the backing 412 are contemplated.

According to the embodiment of FIGS. 3A-3E, the backing 412 can be a mesh 416, such as a chain link mesh, for example. The mesh 416 can have the plurality of linkages 414 connected together. The linkages 414 can extend in various directions across the display 400 such as generally longitudinal (left/right in the plane of view) from a first edge 415A to or closely adjacent a second edge 415B and laterally (up/down in the plane of view) from a third edge 415C to or closely adjacent a fourth edge 415D (these items are numbered in reference to FIG. 3A only unless otherwise indicated). The layout and interlinked configuration of the plurality linkages 414 shown in FIGS. 3A-3D is exemplary and non-limiting. Various layouts and interlinked configurations of the plurality of linkages 414 are contemplated. The backing 412 can be constructed of any known material, thus, the backing 412 can be polymer, metal, ceramic, glass, composite thereof, etc. The mesh 416, if utilized, can be constructed of fibers or filaments including natural or synthetic fibers according to some embodiments.

FIGS. 3A-3E show various exemplary configurations for the backing 412. As shown in FIG. 3A, the backing 412 can take up substantially an entirety of a second major surface 418 of the display 400. Thus, the backing 412 can extend to or closely adjacent the first edge 415A, second edge 415B, third edge 415C and fourth edge 415D. Thus, the backing 412 of FIG. 3A can be positioned behind and can support the glass substrate 402 (FIG. 2), frame 404 (FIG. 2), display module and/or other components of the display 400.

Figure 3B:
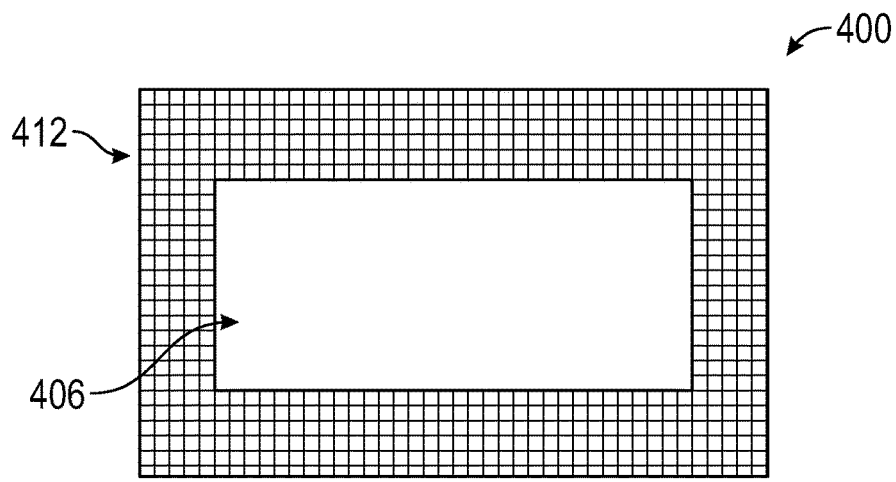
FIG. 3B is a back view of the display of FIG. 2 having the backing with a second configuration according to a second embodiment.

FIG. 3B shows the backing 412 can be applied, cut or otherwise positioned around the opening 406 defined by the frame 404 (FIG. 2). Thus, the opening 406 is uncovered by the backing 412. The backing 412 of FIG. 3B can be positioned behind and can support the frame 404 (FIG. 2).

Figure 3C:
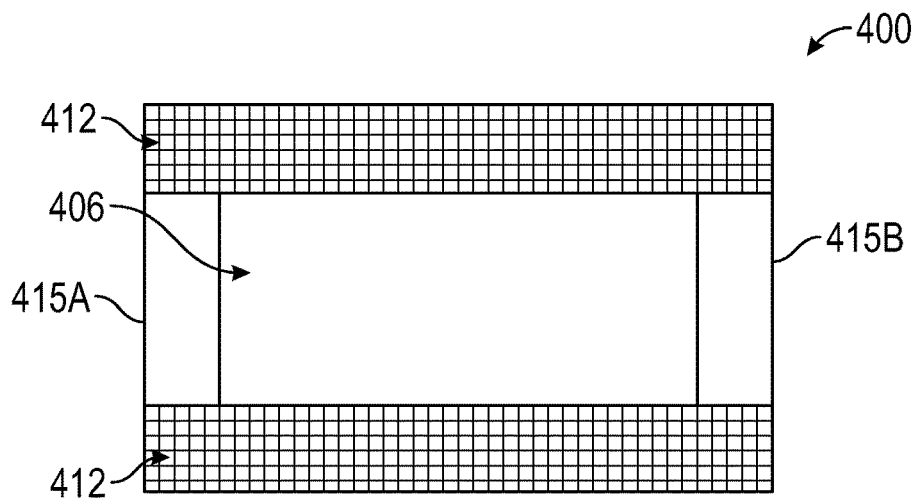
FIG. 3C is a back view of the display of FIG. 2 having the backing with a third configuration according to a third embodiment.
Figure 3D:
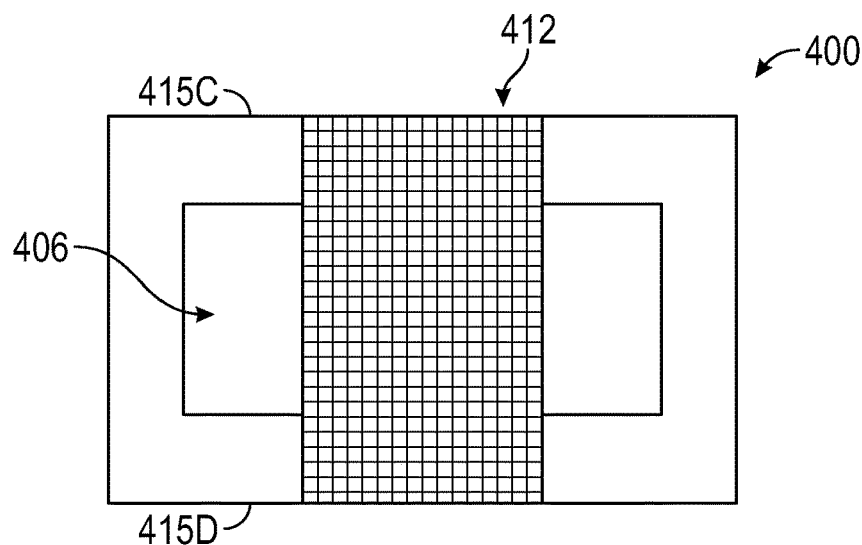
FIG. 3D is a back view of the display of FIG. 2 having the backing with a fourth configuration according to a fourth embodiment.

FIGS. 3C and 3D show the backing 412 can be applied, cut or otherwise positioned around or across the opening 406. Thus, the backing 412 can cover only selective portions of the frame 404. In FIG. 3C, the backing 412 extends from or closely adjacent the first edge 415A to or closely adjacent the second edge 415B. In FIG. 3D, the backing extends from or closely adjacent the third edge 415C to or closely adjacent the fourth edge 415D. The backing 412 can provide structural support and/or can facilitate curvature of the display 400 in the selected areas applied as further discussed herein. Taking FIG. 3D as an example, the backing 412 can facilitate and/or support a curvature of the display 400 in this middle region of the display 400 illustrated.

Figure 3E:
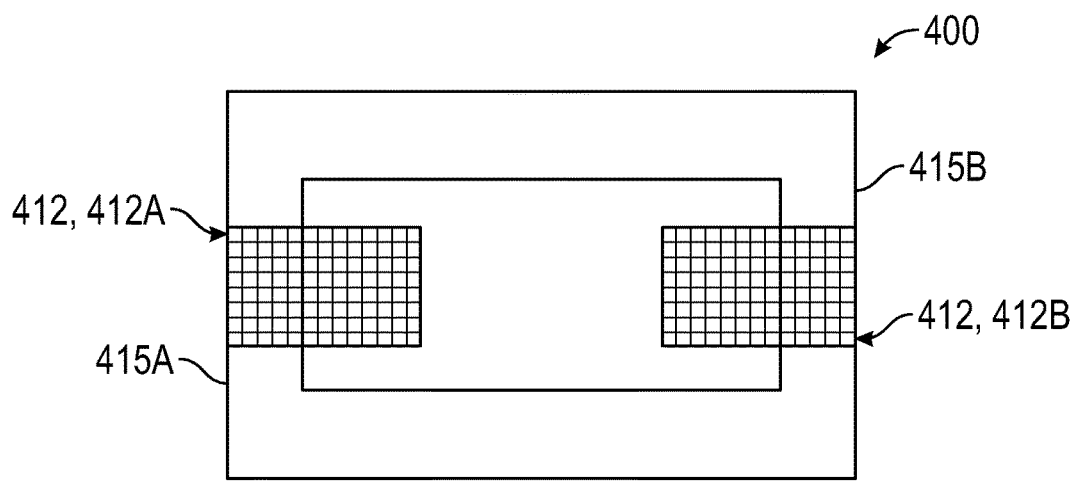
FIG. 3E is a back view of the display of FIG. 2 having the backing with a fifth configuration according to a fifth embodiment.

FIG. 3E shows an embodiment where the backing 412 is separated in to distinct portions 412A and 412B that are positioned on opposing ends of the display 400 such as at or closely adjacent the first edge 415A and at or closely adjacent the second edge 415B. The backing 412 can provide structural support and/or can facilitate curvature of the display 400 in these selected areas. The embodiment of FIG. 3E can further be configured to enable the display 400 to be flexible with a dynamic bending capability as further illustrated and discussed in FIGS. 9A and 9B. Furthermore, any of the embodiments of FIGS. 3A-3E can provide such a capability for the display 400 as further discussed herein.

Figure 4A:
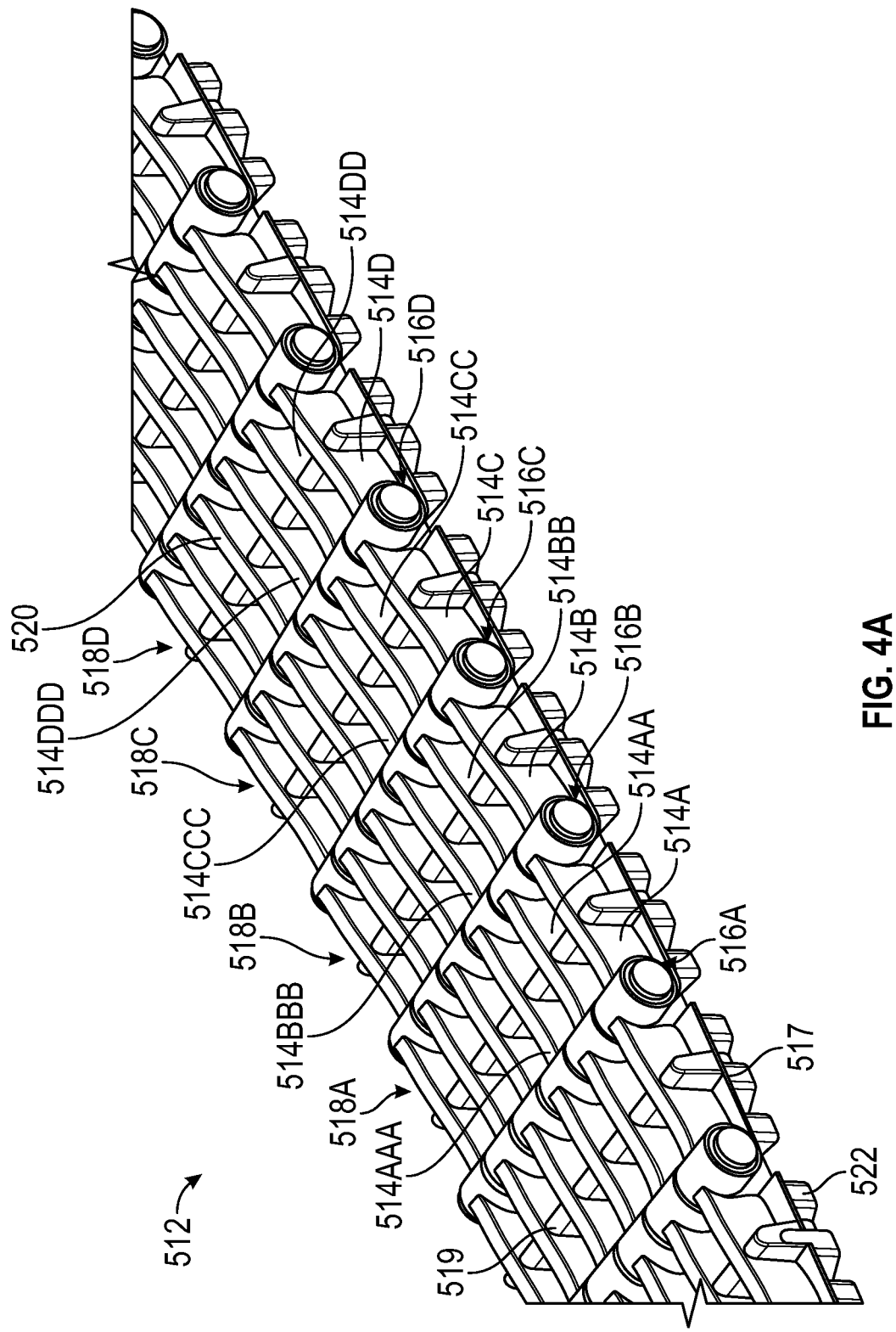
FIGS. 4A and 4B are perspective views of the backing according to one embodiment.
Figure 4B:
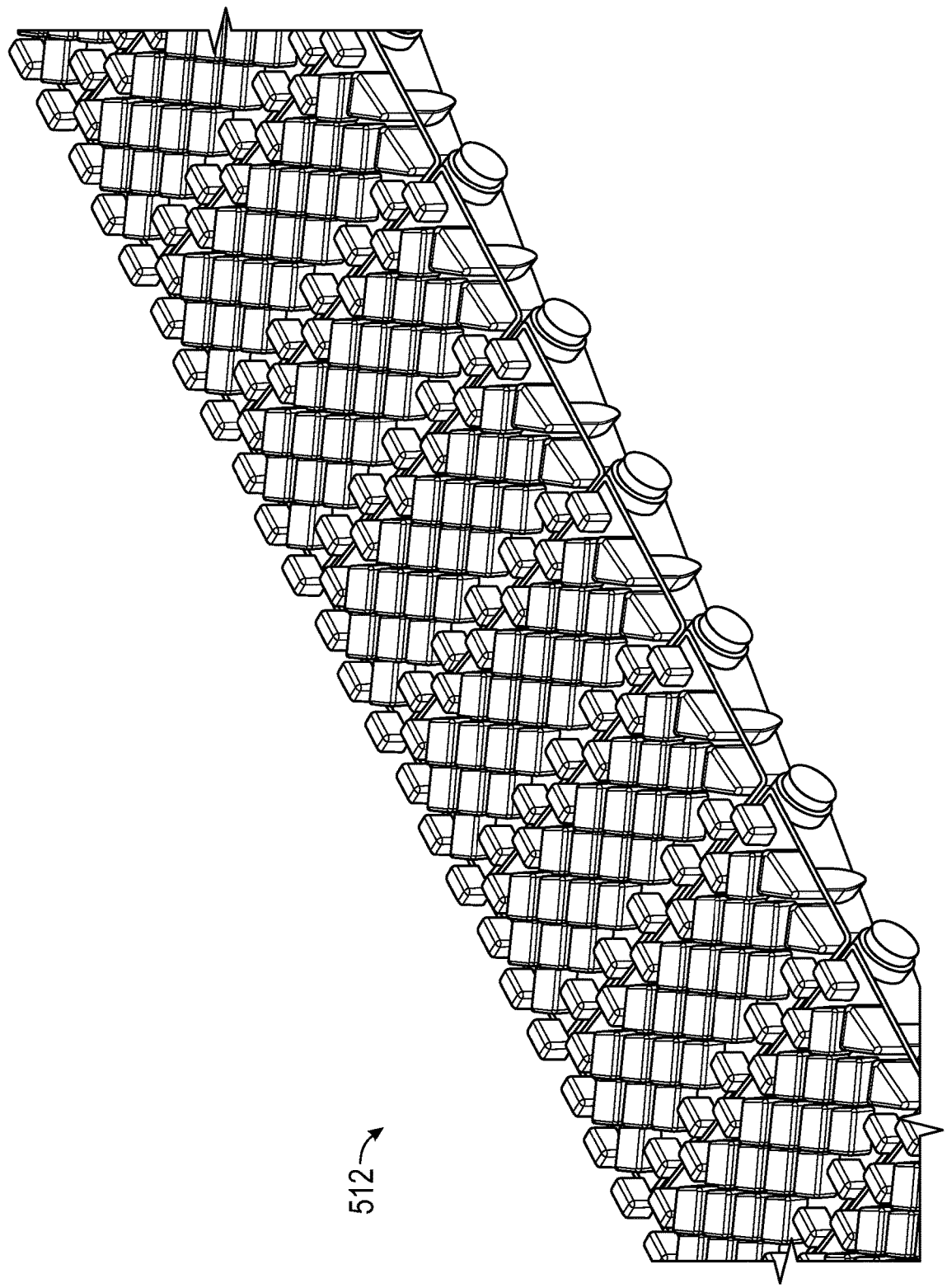

FIGS. 4A and 4B show a backing 512 according to one embodiment. FIG. 4A shows a first side of the backing 512 and FIG. 4B shows an opposing side of the backing 512. Unless otherwise indicated all reference numbers are provided in regard to FIG. 4A.

The backing 512 can include a plurality of linkages 514A, 514B, 514C, 514D, etc., a plurality of articulating joints 516A, 516B, 516C, 516D, etc. For brevity only a limited number of the linkages and articulating joints are provided with reference numbers with the understanding that the backing 512 can be constructed with any number of linkages and articulating joints as desired. The backing 512 can optionally include a covering 517 on one or more major surfaces thereof.

The plurality of linkages 514A, 514B, 514C, 514D can comprise metal members having a longitudinal length between the plurality of articulating joints 516A, 516B, 516C, 516D. Taking linkage 514A as an example, the linkage 514A can extend longitudinally (corresponding to the Cartesian y-axis) from the articulating joint 516A to the articulating joint 516B. As shown in FIG. 4A, the plurality of linkages 514A, 514B, 514C, 514D can be staggered slightly from one another in a lateral direction (corresponding to the Cartesian x-axis) in an alternating manner. The plurality of linkages 514A, 514B, 514C, 514D can be joined together in a selectively moveable manner at the respective plurality of articulating joints 516B, 516C, 516D. Each of the plurality of linkages 514A, 514B, 514C, 514D can include an aperture or other feature of one of the plurality of articulating joints 516A, 516B, 516C, 516D.

As shown in FIG. 4A, the backing 512 can be formed by a plurality of segments 518A, 518B, 518C, 518D, etc. comprised of the linkages. These linkages can include the plurality of linkages 514A, 514B, 514C, 514D and additional pluralities of linkages (e.g., linkages 514AA, 514BB, 514CC, 514DD, linkages 514AAA, 514BBB, 514CCC, 514DDD, etc.) be positioned laterally of (spaced) and can be arranged generally in parallel with the plurality of linkages 514A, 514B, 514C, 514D. Together, the plurality of linkages 514A, 514B, 514C, 514D, etc., 514AA, 514BB, 514CC, 514DD, etc., 514AAA, 514BBB, 514CCC, 514DDD, etc. can define a first major surface 520 and a second major surface 522 of the backing 512.

According to some examples, the plurality of segments 518A, 518B, 518C, 518D, can be formed of a plurality of linkages that are integrally formed together and/or connected by a cross member 519 (better illustrated in FIG. 5) or other structure. Thus, according to some examples, the linkages 514A, 514B, 514C, 514D, etc., 514AA, 514BB, 514CC, 514DD, etc., 514AAA, 514BBB, 514CCC, 514DDD, etc. can be respectively connected in the lateral direction by components (here cross member 519) other than the plurality of articulating joints 516A, 516B, 516C, 516D.

The first major surface 520 can be defined by spaced side surfaces of the individual linkages of the plurality of segments 518A, 518B, 518C, 518D, etc. The second major surface 522 can be abutted by the covering 517, for example. The covering 517 can comprise adhesive, foam, rubber or other desired materials.

The plurality of articulating joints 516A, 516B, 516C, 516D can extend laterally through and connect multiple ones of the corresponding plurality of linkages 514A, 514B, 514C, 514D, 514AA, 514BB, 514CC, 514DD, 514AAA, 514BBB, 514CCC, 514DDD. Thus, for example, the articulating joints 516A and 516B can connect together linkages 514A, 514AA, and 514AAA. This can be in addition to connecting linkage 514A to linkage 514B as is the case with articulating joint 516B. The linkages 514A, 514AA, and 514AAA can be selectively moveable in unison via the articulating joints 516A and 516B so as to maintain the first major surface 520 and the second major surface 522. The linkages 514B, 514BB, 514BBB, etc. and articulating joints 516C, etc. can be similarly constructed. Thus, the plurality of articulating joints 516A, 516B, 516C, 516D can connect the plurality of segments 518A, 518B, 518C, 518D together in a selectively moveable manner relative to one another.

According to the embodiment of FIGS. 4A and 4B, the backing 512 can comprise a metal (e.g., aluminum alloy) chain such as Lynxmotion chain track, which is commercially available from RobotShop Inc. Although described and illustrated in the embodiment of FIGS. 4A and 4B as utilizing articulating joints, the backings disclosed herein need not include articulating joints such as hinges in some embodiments. For example, filament, fiber or other type of mesh can have sufficient flexibility and capability for relative movement such that articulating joints are not necessary according to some embodiments of the backing. Although the articulating joints shown in FIGS. 4A and 4B comprise hinges, other types of articulating joints such as those using folds, creases, slots, hooks, latches, etc. are contemplated.

Figure 5:
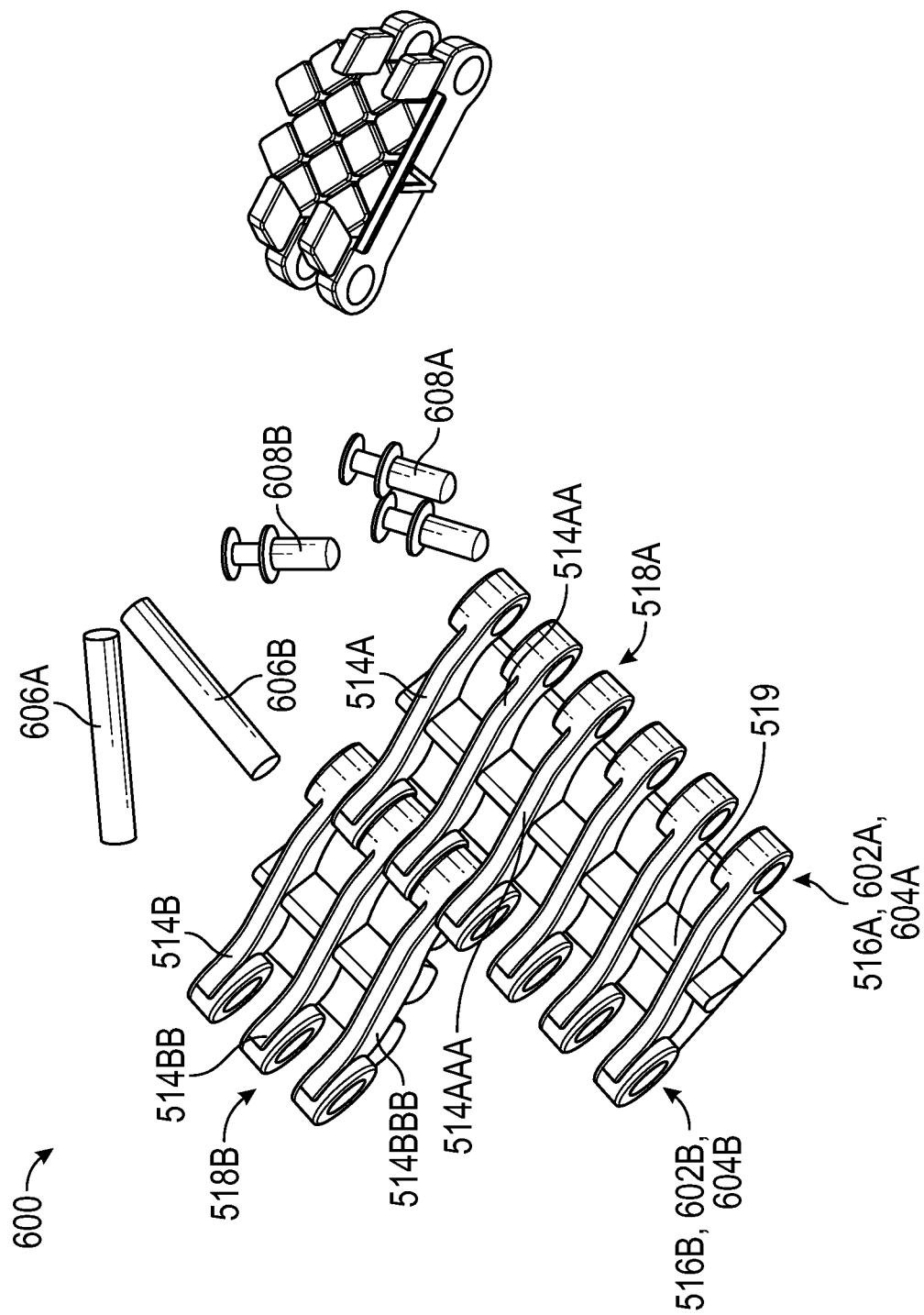
FIG. 5 is a perspective view of a system of components that can be used to form the backing of FIGS. 4A and 4B.

FIG. 5 shows a system 600 for forming the backing 512 of FIGS. 4A and 4B. The system 600 includes one or more of the plurality of segments 518A, 518B, 518C, 518D, etc. (only segment 518A and a portion of segment 518B are shown in FIG. 5) and the articulating joints 516A and 516B. The segment 518A can include the cross-member 519 and the plurality of linkages 514A, 514AA, 514AAA, etc. The articulating joints 516A and 516B can comprise hinges 604A and 604B. The hinges 604A and 604B can be partially formed by apertures 602A and 602B of the plurality of linkages 514A, 514AA, 514AAA, etc. and can further include axles 606A and 606B and end caps 608A and 608B.

FIG. 5 shows the portion of the segment 518B that has linkages 514B, 514BB, 514BBB, etc., configured to insert between the plurality of linkages 514A, 514AA, 514AAA, etc. of the segment 518A. Together apertures of these linkages of including the plurality of linkages 514A, 514AA, 514AAA, etc. of the segment 518A can define a common aperture for the hinge 604B. The axle 606B and end cap 608B can be inserted (or removed from) in this common aperture.

The axle 606A can be configured to be insertable through the apertures 602A of the respective linkages 514A, 514AA, 514AAA, etc. (and apertures of an additional linkage not illustrated in FIG. 5). The end cap 608A can be insertable in the axle 606A and in the aperture 602A of the linkage 514A, for example. Similarly, the axle 606B can be configured to be insertable in the manner previously described.

Figure 5A:
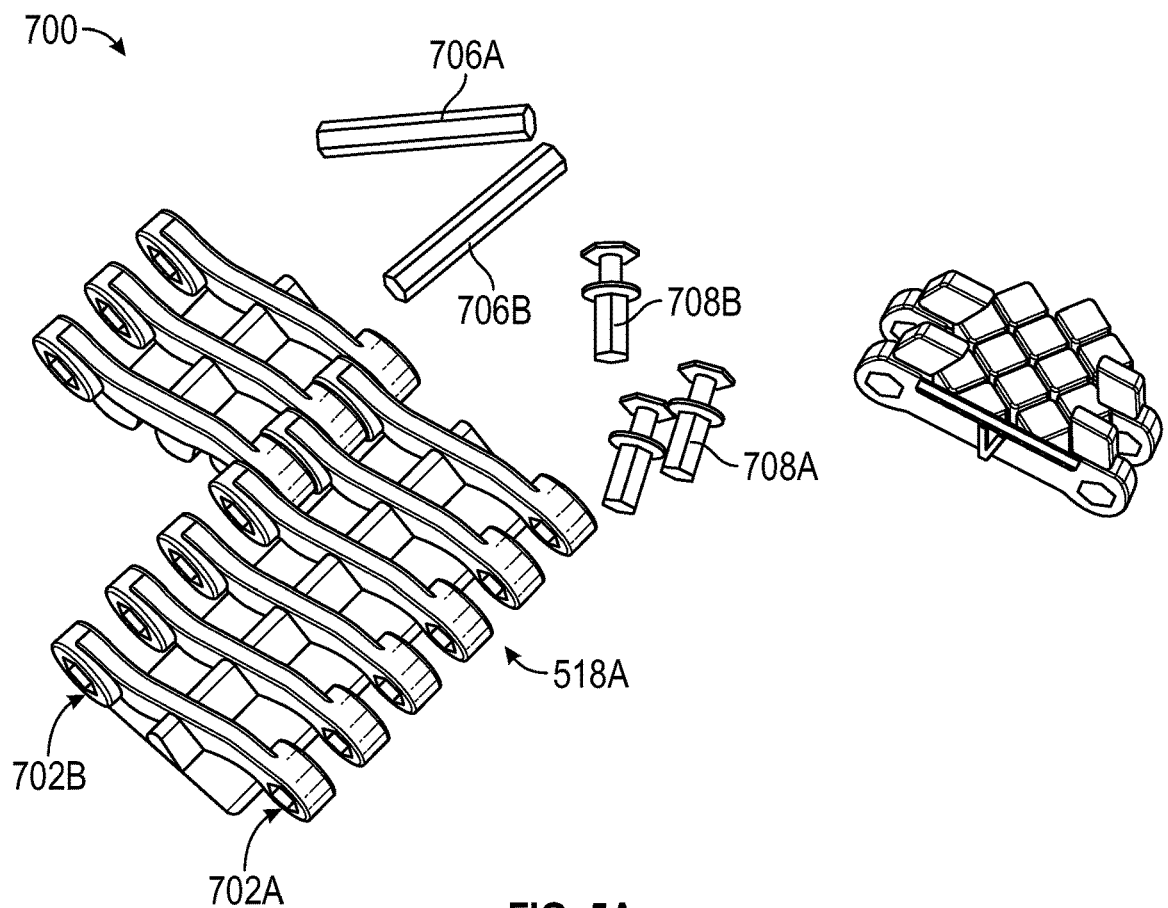
FIG. 5A is a perspective view of a second system of components that can be used to form the backing of FIGS. 4A and 4B.

FIG. 5A shows an alternative system 700 for forming the backing 512 of FIGS. 4A and 4B. This system 700 can be the same as the system 600 previously described but can differ in that apertures 702A, 702B, axles 706A, 706B and/or end caps 708A, 708B can be polygonal (e.g., hexagonal) in cross-section. Such a construction for these components can allow segment 518A to be selectively positionally fixed (positionally locked) relative to other segments via hinges 704A and 704B. More particularly, the axles 706A and 706B can be removable from the segment 518A and adjoining segments. The segment 518A can then be positioned as desired relative to the adjoining segments. The axles 706A and 706B can then be inserted into the respective apertures 702A, 702B. Due to the shape of the axles 706A and 706B and the apertures 702A and 702B, the segment 518A is not moveable (is locked as used herein) relative to the adjoining segments.

Although described in reference to polygonal features (e.g., polygonal axle and aperture), the backing 512 can be configured to have segments or linkages that can selectively positionally fixed (positionally locked) relative to other segments or linkages by other mechanical mechanisms known in the art. Thus, the articulating joints could utilize snap-fit, snap connection, interference fit or other features such as indents, tabs, gears, hooks, rack/pinion, or other mating male/female connection. Thus, according to some embodiments, the locking of the segments or linkages can be facilitated by any one or combination of retaining the plurality of linkages with the bonding medium (described subsequently in reference to FIG. 6C), retaining the plurality of linkages by applying a second adhesive over the articulating joint or adjacent the articulating joint (described subsequently in reference to FIG. 6B), applying the adhesive over the articulating joint (described subsequently in reference to FIG. 6C), mating a female portion of the articulating joint with a male portion of the articulating joint (described in reference to FIG. 5A) or creating a fixed connection at the articulating joint (described in reference to FIG. 5A).

Figure 6A:
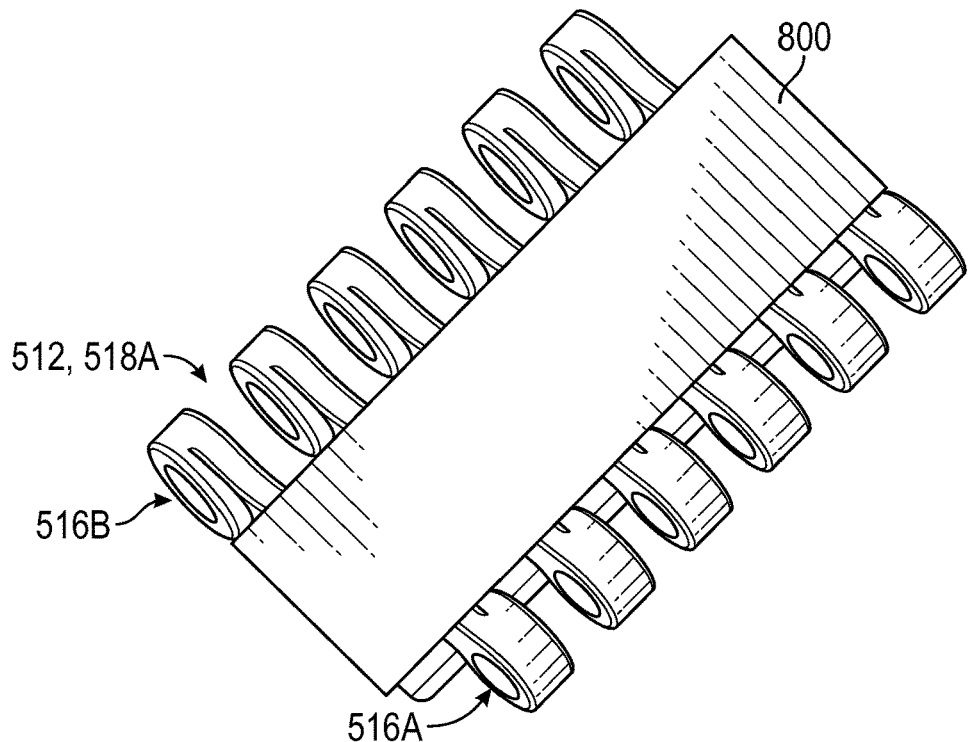
FIG. 6A is a perspective view of part of the system of FIG. 5, which can be used in combination with a bonding medium according to one embodiment.

FIG. 6A shows the one segment 518A of the backing 512. The segment 518A has a bonding medium 800 attached to the first major surface 520 thereof. The bonding medium 800 can comprise a structural adhesive according to one embodiment. The structural adhesive can include polyurethanes (e.g., DP604NS available from 3M®, Saint Paul, MN, as well as Betamate 73100/002, 73100/005, 73100/010, Betaseal X2500, and Betalink K2, from Dupont®, Wilmington, DE), polysiloxanes and silane-modified polymers (e.g., TEROSON RB IX, also known as TEROSTAT MS 9399 and TEROSON MS 647, available from Loctite®), and epoxies (e.g., Scotch-Weld™ Epoxy Adhesive DP125 and DP604 available from 3M®, Saint Paul, MN).

Additional adhesives include, but not limited to, an adhesive selected from one of more of the categories: (a) Toughened Epoxy (for example, Masterbond EP21TDCHT-LO, 3M Scotch Weld Epoxy DP460 Off-white); (b) Flexible Epoxy (for example, Masterbond EP21TDC-2LO, 3M Scotch Weld Epoxy 2216); (c) Acrylics and/or Toughened Acrylics (for example, LORD Adhesive 403, 406 or 410 Acrylic adhesives with LORD Accelerator 19 or 19 GB w/LORD AP 134 primer, LORD Adhesive 850 or 852/ LORD Accelerator 25 GB, Loctite HF8000, Loctite AA4800); (d) Urethanes (for example, 3M Scotch Weld Urethane DP640 Brown, SikaForce 7570 L03, SikaForce 7550 L15, Sikaflex 552 and Polyurethane (PUR) Hot Melt adhesives such as, Technomelt PUR 9622-02 UVNA, Loctite HHD 3542, Loctite HHD 3580, 3M Hotmelt adhesives 3764 and 3748); and (e) Silicones (Dow Corning 995, Dow Corning 3-0500 Silicone Assembly adhesive, Dow Corning 7091, SikaSil-GP). In some cases, structural adhesives available as sheets or films (for example, but not limited to, 3M Structural adhesive films AF126-2, AF 163-2M, SBT 9263 and 9214, Masterbond FLM36-LO) may be utilized.

Furthermore, pressure sensitive adhesives such as 3M VHB tapes can comprise the bonding medium 800 according to some embodiments. In such embodiments, utilizing a pressure sensitive adhesive (such as the tape) allows for the curved glass substrate to be bonded to the backing (and/or forming apparatus) without the need for, among other things, a curing step. Thus, the bonding medium 800 can be any one of or a combination of VHB tape, foam tape, pre-cured adhesive dots or other shapes, rigid polymer, compliant polymer or fully or partially cured adhesive (cured fully or partially).

The bonding medium 800 can be rigid, semi-rigid or compliant. As discussed, the bonding medium 800 and/or the backing 512 (and/or the forming apparatus) can optionally be used only in critical stress areas to prevent glass compression prior to full curing of the adhesive, for example. The backing 512, in particular the sides of the linkages 514A, 514AA, 514AAA, etc. that interface with the bonding medium 800 can have mechanical features such as grooves, ridges, etc. to improve attachment, provide alignment or otherwise improve performance of the bonding medium 800, for example. The bonding medium 800 could be sacrificial or permanent. Sacrificial bonding medium 800 could be cut or otherwise removed and shaped. In some cases, it can be replaced with another bonding medium such as adhesive later.

According to the embodiment of FIG. 6A, the bonding medium 800 can be cut or otherwise shaped to allow the articulating joints 516A and 516B to be exposed and free of the bonding medium 800. This can facilitate selective movement of the segment 518A relative to adjoining segments via the articulating joints 516A and 516B this can facilitate the dynamic capability of the backing 512 for bending of the glass substrate of the display as further described in reference to FIGS. 8-9D.

The bonding medium 800 can have any desirable thickness between the glass substrate and the backing 512. The thickness of the bonding medium 800 can be tailored to, among other things, ensure lamination between the backing 512 and the cold-formed glass substrate. Exemplary thicknesses for the bonding medium 800 can be 5 mm, 3 mm, 2 mm, 1 mm, 0.5 mm, 0.25 mm, 0.01 mm, or less and may be applied in a variety of ways. The bonding medium 420 can have a thickness in a range from about 200 μm to about 500 μm, from about 225 μm to about 500 μm, from about 250 μm to about 500 μm, from about 275 μm to about 500 μm, from about 300 μm to about 500 μm, from about 325 μm to about 500 μm, from about 350 μm to about 500 μm, from about 375 μm to about 500 μm, from about 400 μm to about 500 μm, from about 200 μm to about 475 μm, from about 200 μm to about 450 μm, from about 200 μm to about 425 μm, from about 200 μm to about 400 μm, from about 200 μm to about 375 μm, from about 200 μm to about 350 μm, from about 200 μm to about 325 μm, from about 200 μm to about 300 μm, or from about 225 μm to about 275 μm In one embodiment, if the bonding medium 800 comprises some of the adhesives described above, it can be applied using an applicator gun and mixing nozzle or premixed syringes or robotic adhesive dispenser, and spread uniformly using any of the following, for example, a roller, a brush, a doctor blade or a draw down bar The bonding medium 800 can also have any suitable length and/or width as defined by the size of the display as previously described. Thus, the bonding medium 800 is not dimensionally limited in either the length or width other than by the size of the display in these dimensions.

Figure 6B:
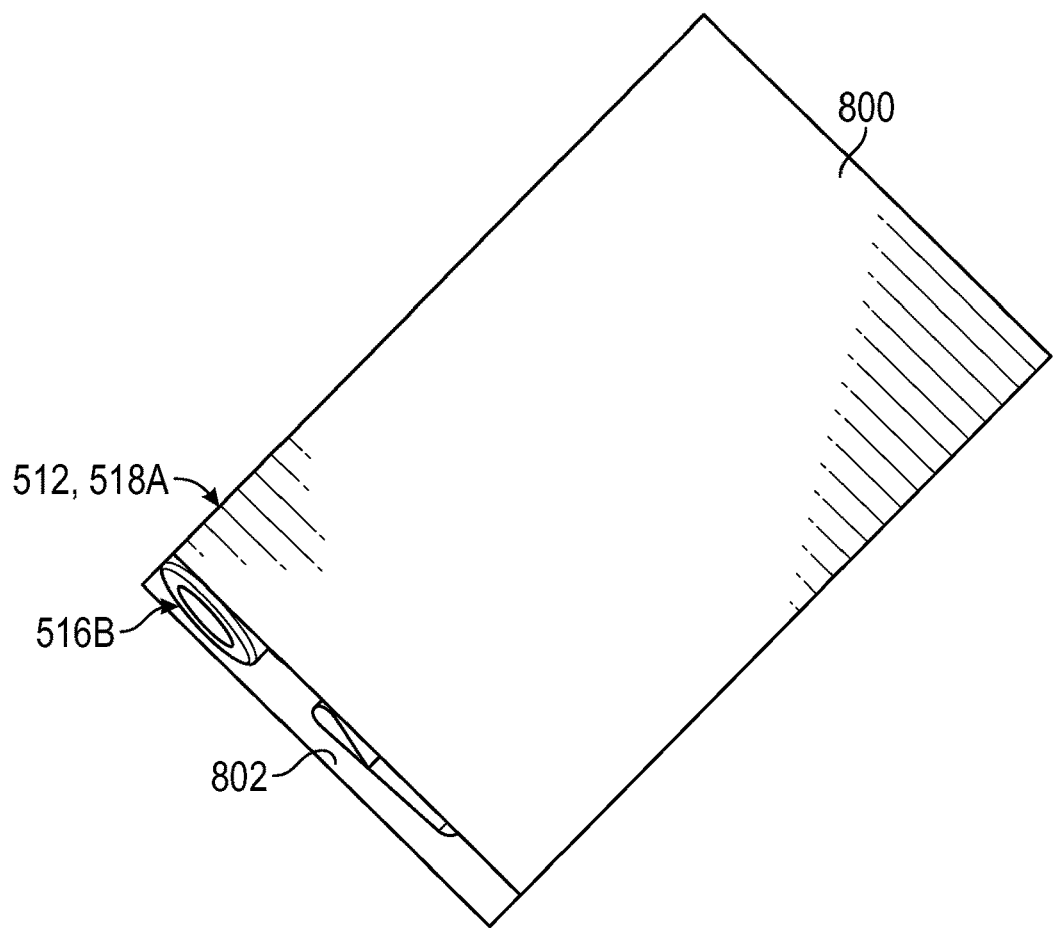
FIG. 6B is a perspective view of part of the system of FIG. 5, which can be used in combination with the bonding medium of FIG. 6A and a second bonding medium according to one embodiment.

FIG. 6B shows an alternative embodiment of the one segment 518A of the backing 512. The segment 518A has the bonding medium 800 attached to the first major surface 520 thereof and a second bonding medium 802 attached to the second major surface 522 thereof. The second bonding medium 802 can be of the same or similar material(s) to the bonding medium 800. As shown in FIG. 6B, the second bonding medium 802 (or indeed the first bonding medium 800) can extend laterally to cover the articulating joints 516A and 516B. When the second bonding medium 802 is cured, such an arrangement can positionally lock the segment 518A relative to adjoining segments in a manner similar to those previously described in reference to FIG. 5A.

Figure 6C:
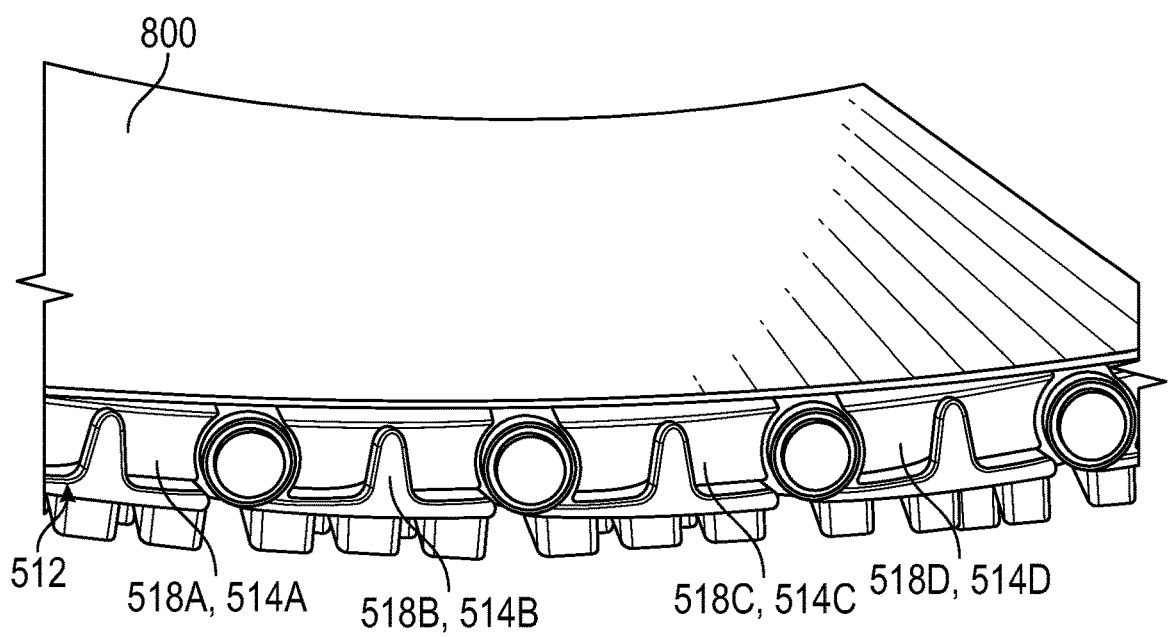
FIG. 6C is a perspective view of the backing of FIGS. 4A and 4B, which can be in combination with the bonding medium according to another embodiment.

FIG. 6C shows the backing 512 with the plurality of segments 518A, 518B, 518C and 518D and linkages 514A, 514B, 514C and 514D being selectively moveable relative to one another via the plurality of hinges 516B, 516C and 516D. FIG. 6C does not illustrate the glass substrate which would be located atop and abutting the bonding medium 800 for clarity. Selective movement of the plurality of segments 518A, 518B, 518C and 518D has accomplished to provide for a desired curvature for the backing 512 between the segments 518A, 518B, 518C and 518D. This curvature can be imparted to the glass substrate via the bonding medium 800. The bonding medium 800 has been applied to the segments 518A, 518B, 518C and 518D and over the articulating joints 516A, 516B, 516C, 516D, etc. and when cured or partially cured, the bonding medium 800 can positionally lock the plurality of segments 518A, 518B, 518C and 518D and linkages 514A, 514B, 514C and 514D in a manner similar to those previously described in reference to FIG. 5A.

As shown in FIG. 6C, the radius of curvature of the central portion of the backing 512 and the bonding medium 800 can be within 500 μm or less of the radius of curvature of the curved portion 408 (FIG. 2) of the glass substrate 402 (FIG. 2). This tolerance can be impacted by the method and forming apparatus for forming the display 400 (FIG. 2) as further discussed in reference to FIGS. 7A and 7B.

Figure 7A:
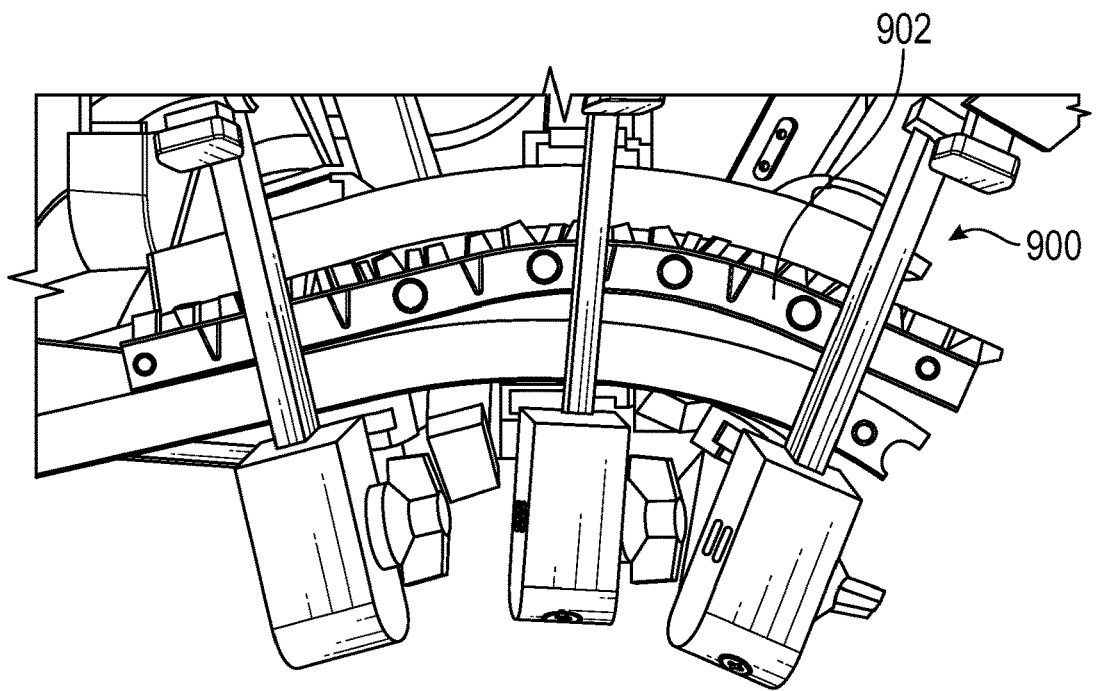
FIGS. 7A and 7B are perspective views illustrating an apparatus and method of forming the display including using the backing of FIGS. 4A and 4B as a forming apparatus according to one embodiment.
Figure 7B:
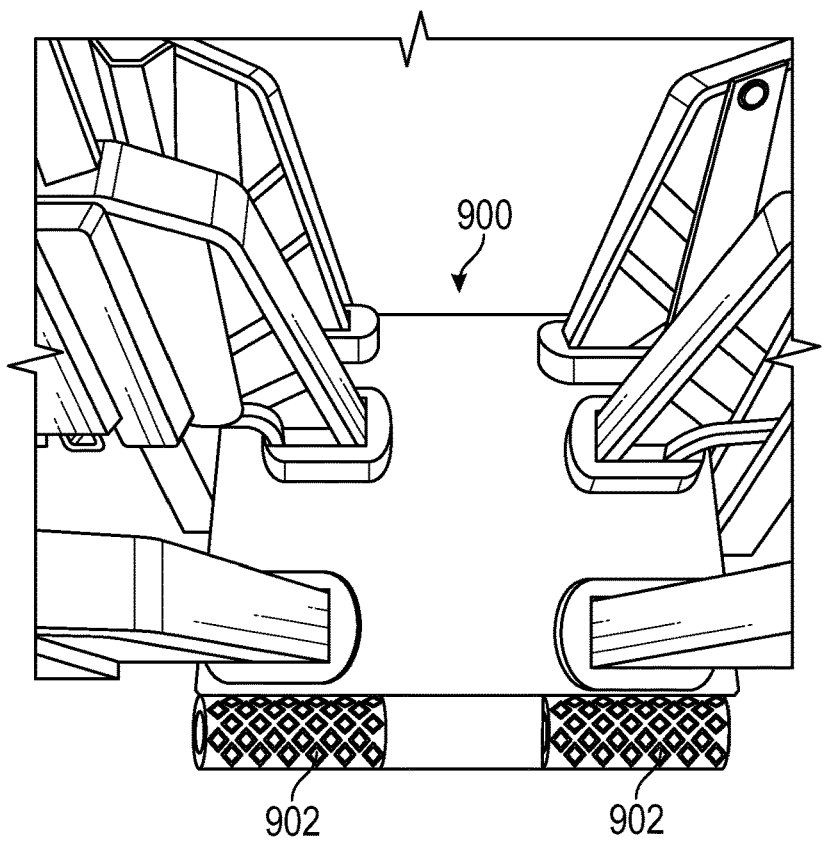

FIGS. 7A and 7B show a method 900 including a forming apparatus 900. The forming apparatus 900 can be the backing 412 as previously described. The method 900 can include the forming apparatus 902, which can have the segments and/or linkages thereof selectively moved to provide for a desired curvature (or other shape) of the forming apparatus 900. The method 900 is illustrated in reference to a test mold that includes clamps and platens. However, it is contemplated that the method 900 can utilize a vacuum forming apparatus (also called a vacuum chuck) for cold forming the glass substrate 402 as previously discussed. Such vacuum forming apparatuses are known in the art for cold forming. A plenum or such as one defined by one or both of the platens or other device can facilitate a pressure differential to the forming apparatus and/or glass substrate.

As shown best in FIG. 7A, the forming apparatus 902 can optionally be positioned between the opposing platens interfacing the glass substrate with the bonding medium positioned therebetween in the manner previously described. The bonding medium can be applied to the glass substrate and adhered. The forming apparatus can be adhered to the glass substrate and bonding medium by the remaining exposed side of the bonding medium. The bonding medium can hold one or more of the linkages of the plurality of linkages (or one or more segments of the plurality of segments) at a desired angle for cold forming by engaging with surface(s) of the linkages pressing into the bonding medium. Various features or techniques of positionally fixing (sometimes termed locking herein) the linkages together with the desired angle were discussed herein previously. The assembly (including the glass substrate, bonding medium and the forming apparatus can be held in a vacuum mold or otherwise compressed (e.g. pressure formed with a mold, etc.) until the bonding medium is strong enough to hold the cold formed curvature desired. This cold formed curvature can be imparted from the forming apparatus to the glass substrate via the bonding medium. The forming apparatus and/or the bonding medium can then optionally be removed from the display.

According to one embodiment of the method, the radius of curvature for the glass substrate can be defined by the forming apparatus 902 as previously described. Recall the forming apparatus 902 may or may not become a part of the display. The forming apparatus 902 can have moveable segments/linkages to achieve the desired radius of curvature as previously described. These segments/linkages can be reusable and/or programmable, for example.

Accordingly, FIGS. 7A and 7B illustrate the method 900 of cold forming a display, console or other feature or component for a vehicle interior system according to one embodiment. The method 900 can include applying a adhesive to a glass substrate, positioning the forming apparatus 902 on the glass substrate with the adhesive positioned therebetween such that the forming apparatus is coupled to the adhesive, wherein the forming apparatus comprises a plurality of linkages configured to be selectively moveable to assume a radius of curvature along a first major surface of the forming apparatus, applying a desired force to the glass substrate and the forming apparatus 902 to compress the adhesive, and maintaining applying the desired force to compress the adhesive for a desired duration of time with the glass substrate clamped to the forming apparatus. The method 900 can further optionally include locking the articulating joint to position the one of the plurality of linkages relative to the at least another one of the plurality of linkages and to reduce or eliminate substantial relative movement between the one of the plurality of linkages and the at least another one of the plurality of linkages.

Figure 8:
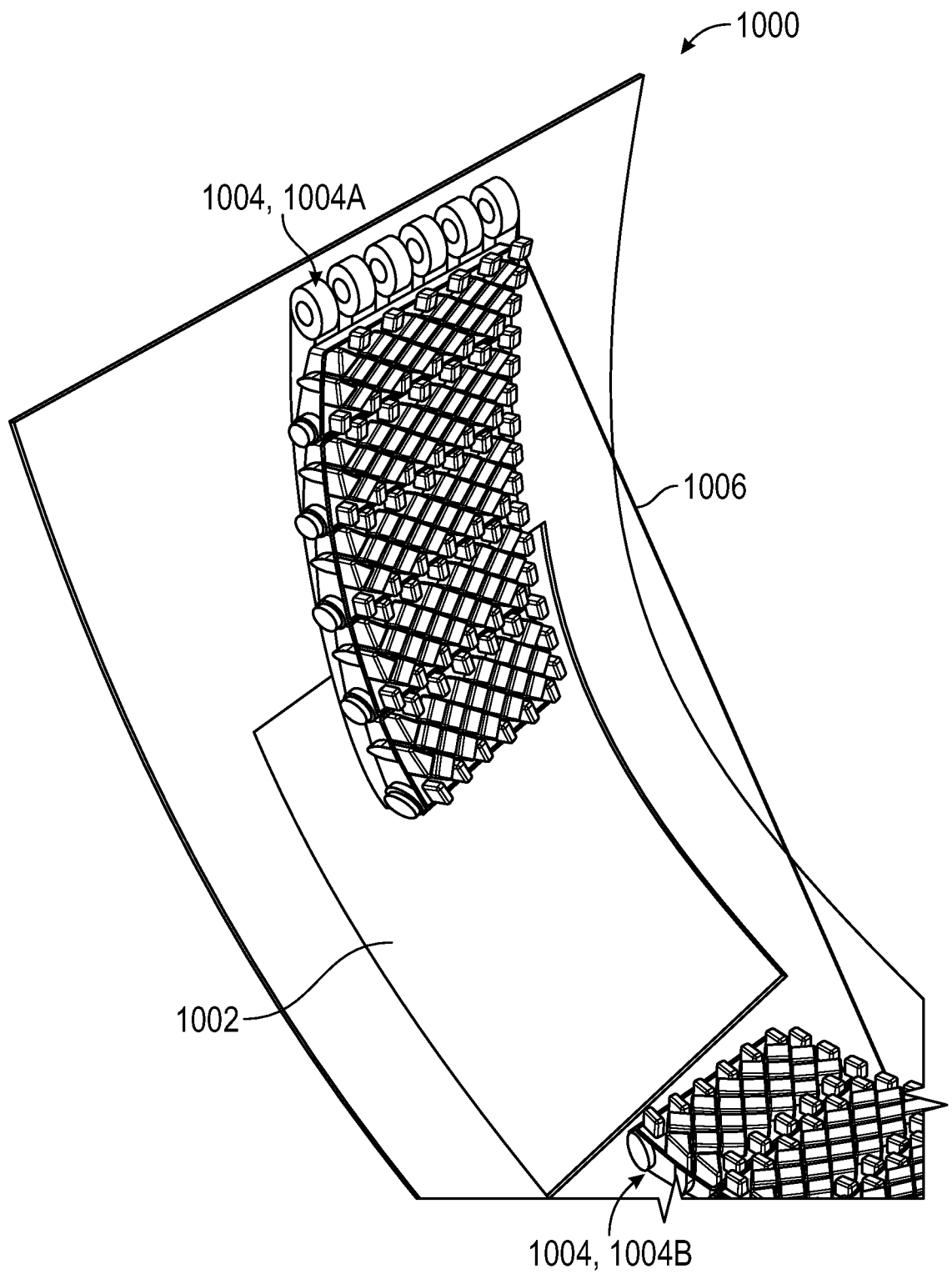
FIG. 8 is a perspective view showing the backing of FIGS. 4A and 4B used in combination with an actuator to facilitate dynamic movement such as for bending of the glass substrate of the display according to one embodiment.

FIG. 8 shows a portion of a display 1000 that is undergoing bending of a glass substrate 1002 thereof. This bending forms a radius of curvature 1003 in this glass substrate 1002. The bending of the glass substrate is being performed by a backing 1004 (e.g., the same as or similar to the backing 512) used in combination with an actuator 1006. This combination of the backing 1004 and the actuator 1006 can facilitate dynamic movement of the display 1000. According to the example of FIGS. 9A and 9D, the actuator 1006 can comprise a reel (not shown) utilizing wire or other line coupled to a first portion 1004A of the backing 1004 and a second portion 1004B of the backing 1004. The first portion 1004A and second portion 1004B can be located on opposing ends of the display 1000.

Figure 9B:
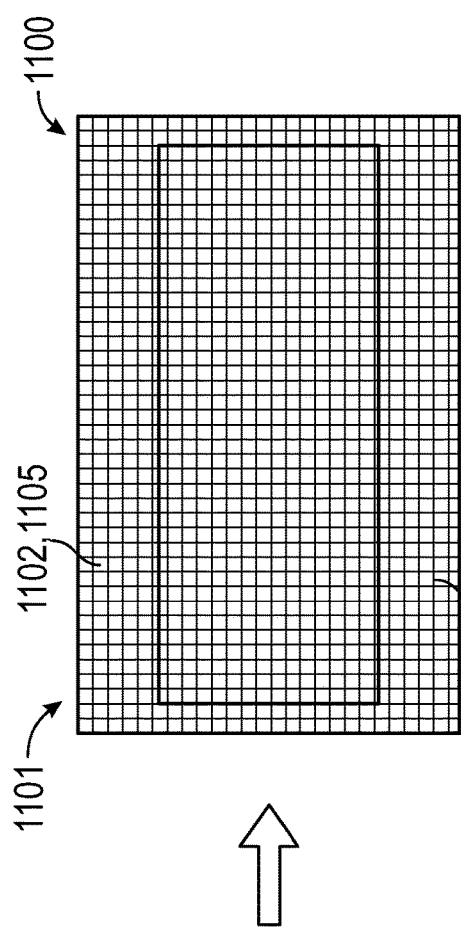
FIGS. 9A-9D are schematic views of any example of the backing such as any of those previously described and illustrated used in combination with one or more actuators to facilitate dynamic movement such as bending of the glass substrate of the display according to one embodiment.
Figure 9C:
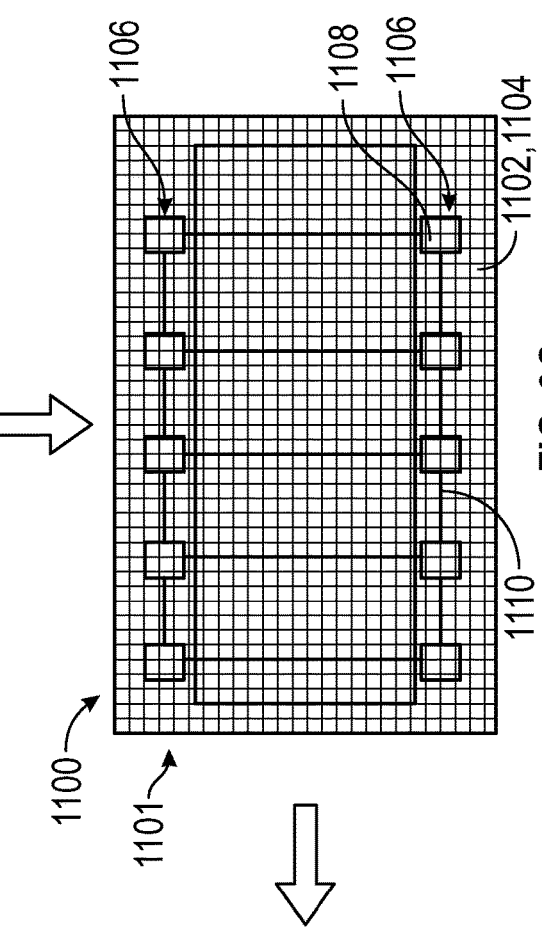
Figure 9A:
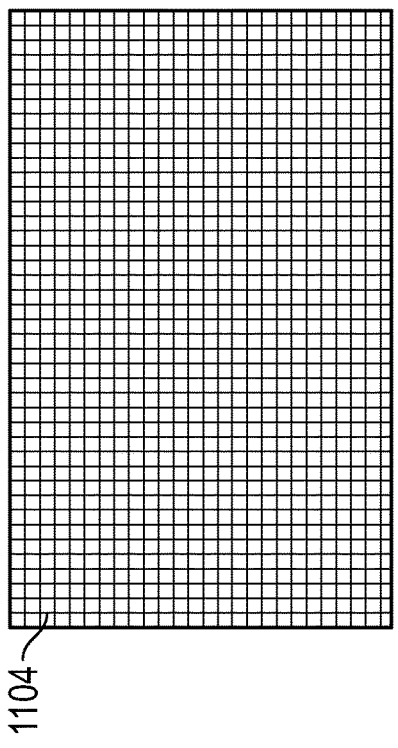
Figure 9D:
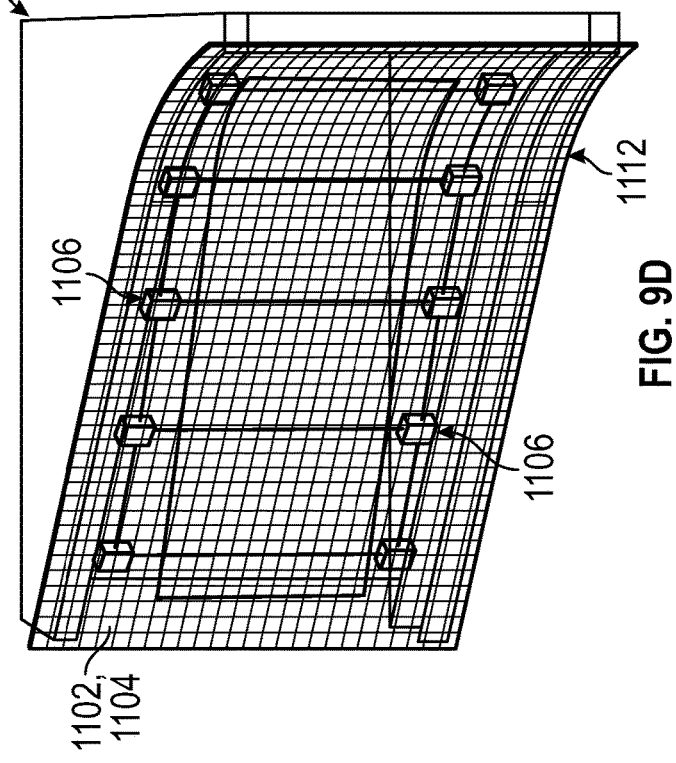

FIGS. 9A-9D illustrate a method 1100 of dynamically altering a shape of a display 1101. The display 1101 can include a glass substrate 1102, a backing 1104 such as any of those previously described and optionally a frame 1105. FIG. 9A shows the backing 1104 alone prior to application to the glass substrate 1102 and frame 1105 via the bonding medium as previously described. FIG. 9B shows the backing 1104 attached to the glass substrate 1102 and frame 1105. FIG. 9C shows at least one actuator 1106 (here a plurality of motors 1108 with shafts 1110) can be coupled to particular segment(s) or linkage(s) of the backing 1104. The at least one actuator 1106 can be arranged to extend across a portion or all of the backing 1104. FIG. 9D shows the at least one actuator 1106 can move the particular segment(s) or linkage(s) of the backing 1104. This can facilitate dynamic movement of the display 1101 such as to form a curved region 1112 along a surface of the glass substrate 1102 thereof.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

The terms "about", "generally", or "correspond" as used herein can allow for a degree of variability in a value or range, for example, within 10%, within 5%, or within 1% of a stated value or of a stated limit of a range.

The term "substantially" or "substantial" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The present disclosure provides for the following embodiments, the numbering of which is not to be construed as designating levels of importance:

Embodiment 1 is an apparatus for housing one or more display modules or other components within a vehicle interior system. The apparatus can optionally include a glass substrate having a curved portion, a backing and a bonding medium. The backing can be configured to support the glass substrate. The backing can comprise a plurality of linkages. One or more of the plurality of linkages can be selectively moveable to interface with and correspond to a radius of curvature of the curved portion of the glass substrate. The bonding medium can attach the glass substrate to the backing.

Embodiment 2 is the apparatus of Embodiment 1, wherein the backing can comprise a mesh formed by connecting the plurality of linkages.

Embodiment 3 is the apparatus of Embodiment 2, wherein the mesh can comprise a chain mail.

Embodiment 4 is the apparatus of any one of Embodiments 1-3, further optionally comprising an articulating joint connecting one of the plurality of linkages with at least a second one of the plurality of linkages. The at least the one of the plurality of linkages can be movable relative to the at least the second one of the plurality of linkages via the articulating joint.

Embodiment 5 is the apparatus of Embodiment 4, wherein the articulating joint can cross-link at least a third of the plurality of linkages with at least a fourth of the plurality of linkages. The at least the third of the plurality of linkages and the at least a fourth of the plurality of linkages can be positioned generally parallel with a respective one of the at least the one of the plurality of linkages and the at least the second one of the plurality of linkages.

Embodiment 6 is the apparatus of any one of Embodiment 5, wherein the articulating joint can be free of being covered by the bonding medium and further optionally comprising one or more actuators that can be configured to drive one or more of the plurality of linkages to a desired position to form the curved portion of the glass substrate.

Embodiment 7 is the apparatus of any one of Embodiments 1-5, further comprising one or more actuators that can be configured to drive one or more of the plurality of linkages to a desired position to control and shape one or more of a curvature or location of the curved portion of the glass substrate.

Embodiment 8 is the apparatus of any one of Embodiments 1-7, wherein the bonding medium can comprise one or more of VHB tape, foam tape, rigid polymer, compliant polymer or fully or partially cured structural adhesive.

Embodiment 9 is the apparatus of any one of Embodiments 1-8, wherein the backing can have one or more features to facilitate coupling of the backing with the bonding medium.

Embodiment 10 is the apparatus of any one of Embodiments 1-9, further optionally comprising a frame coupled to the glass substrate.

Embodiment 11 is the apparatus of any one of Embodiments 1-10, wherein the bonding medium can lock a relative position of the plurality of linkages when cured.

Embodiment 12 is the apparatus of Embodiment 11, wherein at least a portion or all of the backing can be removed from the apparatus prior to installation into the vehicle interior system.

Embodiment 13 is a method of cold forming a display or console for a vehicle interior system. The method can optionally include any one or combination of: applying an adhesive to a glass substrate, positioning a forming apparatus on the glass substrate with the adhesive positioned therebetween such that the forming apparatus is coupled to the adhesive, wherein the forming apparatus comprises a plurality of linkages configured to be selectively moveable to assume a radius of curvature along a first major surface of the forming apparatus, applying a desired force to the glass substrate and the forming apparatus to compress the adhesive, and maintaining applying the desired force to compress the adhesive for a desired duration of time with the glass substrate clamped to the forming apparatus.

Embodiment 14 is the method of Embodiment 13, further optionally comprising an articulating joint connecting one of the plurality of linkages with at least another one of the plurality of linkages, and wherein at least two of the plurality of linkages are selectively movable relative to one another via the articulating joint.

Embodiment 15 is the method of Embodiment 14, further optionally comprising locking the articulating joint to position the one of the plurality of linkages relative to the at least another one of the plurality of linkages and to reduce or eliminate substantial relative movement between the one of the plurality of linkages and the at least another one of the plurality of linkages.

Embodiment 16 is the method of Embodiment 15, wherein the locking can comprise at least one of retaining the plurality of linkages with the adhesive, retaining the plurality of linkages by applying a second adhesive over the articulating joint or adjacent the articulating joint, applying the adhesive over the articulating joint, mating a female portion of the articulating joint with a male portion of the articulating joint or creating a snap fit connection at the articulating joint.

Embodiment 17 is the method of any one of Embodiments 13-16, further optionally comprising an apparatus produced by the method of cold forming.

Embodiment 18 is a system for a display, console or other component of a vehicle. The system can optionally include a glass substrate having a curved portion, a backing, a forming apparatus and a bonding medium. The backing can be configured to support the glass substrate. The backing can comprise a first plurality of linkage. One or more of the first plurality of linkages can be selectively moveable to interface with and correspond to a radius of curvature of the curved portion of the glass substrate. The forming apparatus can be configured to provide the glass substrate with the curved portion. The forming apparatus can comprise a second plurality of linkages configured to be selectively moveable to assume a second radius of curvature along a first major surface of the forming apparatus. The second radius of curvature can correspond with the radius of curvature of the curved portion of the glass substrate. The bonding medium can be configured to attach the glass substrate to one of the backing or the forming apparatus.

Embodiment 19 is the system of Embodiment 18, wherein the first plurality of linkages can be connected by a first plurality of articulating joints and the second plurality of linkages can be connected by a second plurality of articulating joints.

Embodiment 20 is the system of Embodiment 19, wherein the first plurality of articulating joints can be configured to selectively positionally lock one or more of the first plurality of linkages at a desired position.

Embodiment 21 is the system of Embodiment 19, wherein the second plurality of articulating joints can be configured to selectively positionally lock one or more of the second plurality of linkages at a desired position.

Embodiment 22 is the system of any one of Embodiments 18-21, further optionally comprising a frame configured to couple to the glass substrate.

Embodiment 23 is the system of any one of Embodiments 18-22, wherein the bonding medium can lock a relative position of second plurality of linkages when cured.

Embodiment 24 is the system of any one of Embodiments 18-22, further optionally comprising one or more actuators configured to drive one or more of the first plurality of linkages to a desired position to form the curved portion of the glass substrate.

Embodiment 25 is the system of any one of Embodiments 18-22, further optionally comprising one or more actuators configured to drive one or more of the first plurality of linkages to a desired position to control and shape one or more of a curvature or location of the curved portion of the glass substrate.

Embodiment 26 is any one or any combination of the foregoing Embodiments or aspects, portions, elements or features of any one or any combination of the foregoing Embodiments.

What is claimed is:

1. An apparatus for housing a display module within a vehicle interior system, comprising:
   a glass substrate; and
   a backing adhered to the glass substrate, the backing comprising mesh or chain forming a plurality of segments connected to one another such that the plurality of segments are selectively movable relative to one another, wherein:
      the backing defines an opening configured to receive the display module,
      the backing does not cover the opening, and
      the plurality of segments are selectively movable to a configuration in which a surface of the backing comprises a desired radius of curvature to bend the glass substrate.

2. The apparatus of claim 1, wherein the backing circumferentially surrounds a periphery of the opening.

3. The apparatus of claim 1, wherein the plurality of segments comprise a plurality of linkages that are connected to one another along a direction in which the glass substrate is bent.

4. The apparatus of claim 3, wherein at least some of the plurality of linkages are configured to be positionally fixed relative to one another to maintain curvature of the glass substrate.

5. The apparatus of claim 4, wherein the plurality of linkages comprise a plurality of linear groups of linkages that are parallel and spaced apart from one another.

6. The apparatus of claim 4, wherein the at least some of the plurality of linkages are positionally fixed by locking articulating joints connecting the plurality of linkages to one another.

7. The apparatus of claim 4, wherein the at least some of the plurality of linkages are positionally fixed via an actuator connecting particular ones of the plurality of segments to one another.

8. The apparatus of claim 1, wherein the glass substrate is bent via movement of the plurality of segments to comprise a curved portion comprising a radius of curvature from 20 mm to 2000 mm.

9. The apparatus of claim 8, wherein the desired radius of curvature formed by the surface of the backing is within 500 µm of the radius of curvature of the curved portion.

10. The apparatus of claim 1, wherein the backing with the plurality of segments is separated into distinct portions that are positioned at opposing ends of the glass substrate.

11. An apparatus comprising:
    a glass substrate comprising a first major surface and a second major surface;
    a bonding medium disposed on the second major surface; and
    a backing adhered to the second major surface via the bonding medium, wherein the backing comprises mesh or chain forming a plurality of segments that are connected to one another such that the plurality of segments are selectively movable relative to one another, wherein the backing defines an opening, wherein the backing does not cover the opening;
    a display module disposed in the opening; and
    an actuator coupled to at least one of the plurality of segments, wherein the actuator is configured to move the plurality of segments relative to one another to facilitate movement of the display module, wherein the plurality of segments are movable to a configuration in which a surface of the backing comprises a desired radius of curvature to bend the glass substrate.

12. The apparatus of claim 11, wherein the bonding medium is structural tape.

13. The apparatus of claim 11, wherein, when placed into the configuration, a structural load is placed on the bonding medium, wherein the structural load is more concentrated in a shear force than a static tensile force.

14. The apparatus of claim 11, wherein the backing circumferentially surrounds a periphery of the opening.

15. The apparatus of claim 11, wherein the plurality of segments comprise a plurality of linkages that are connected to one another along a direction in which the glass substrate is bent.

16. The apparatus of claim 15, wherein at least some of the plurality of linkages are configured to be positionally fixed relative to one another to maintain curvature of the glass substrate.

17. The apparatus of claim 15, wherein the plurality of linkages comprise a plurality of linear groups of linkages that are parallel and spaced apart from one another.

18. The apparatus of claim 11, wherein the glass substrate is bent via movement of the plurality of segments to comprise a curved portion comprising a radius of curvature from 20 mm to 2000 mm.

19. The apparatus of claim 18, wherein the desired radius of curvature formed by the surface of the backing is within 500 µm of the radius of curvature of the curved portion.

20. The apparatus of claim 11, wherein the backing with the plurality of segments is separated into distinct portions that are positioned at opposing ends of the glass substrate.

* * * * *